April 25, 1961  J. O. MELTON  2,981,102
WELL DEPTH RECORDER
Filed March 23, 1956  10 Sheets-Sheet 1

INVENTOR
*James O. Melton*

BY *Stevens, Davis, Miller and Mosher*
ATTORNEYS

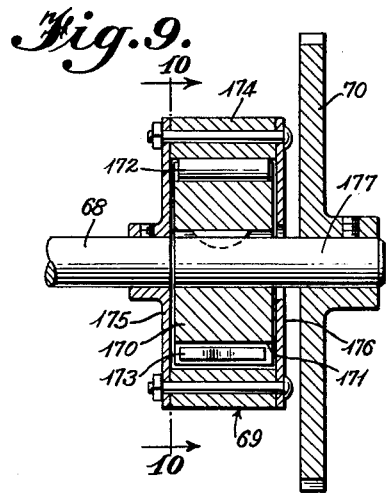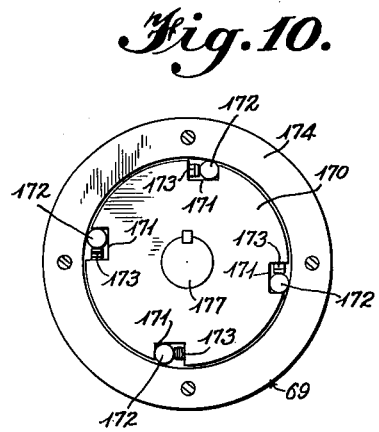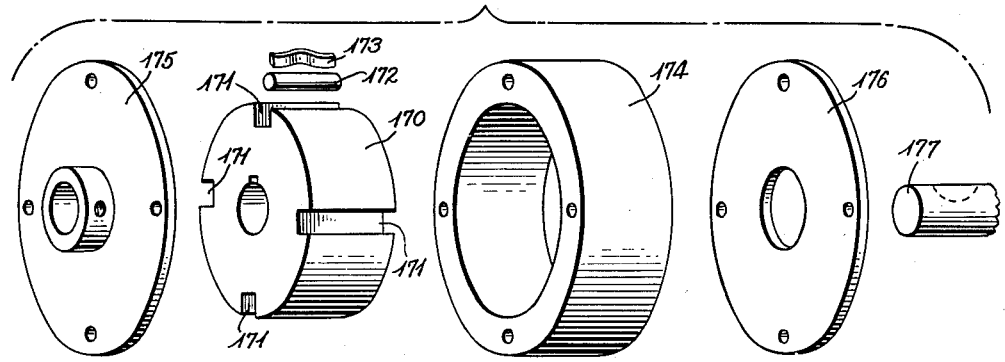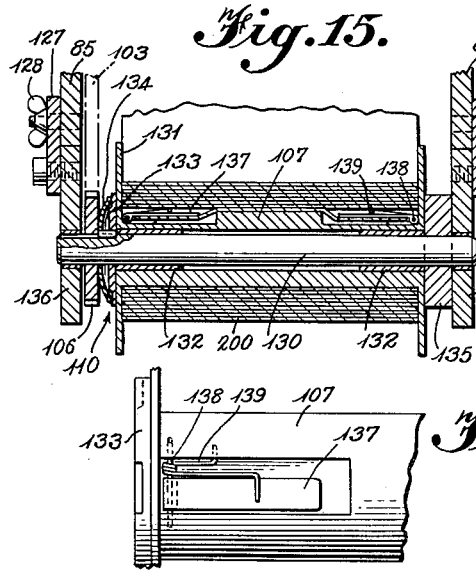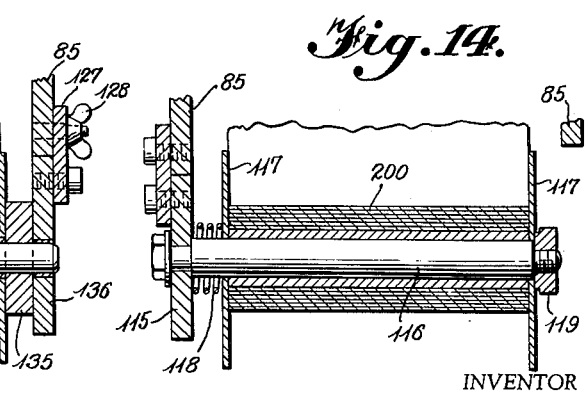

April 25, 1961 J. O. MELTON 2,981,102
WELL DEPTH RECORDER
Filed March 23, 1956 10 Sheets-Sheet 3

INVENTOR
James O. Melton

BY Stevens, Davis, Miller & Mosher
ATTORNEYS

April 25, 1961  J. O. MELTON  2,981,102
WELL DEPTH RECORDER
Filed March 23, 1956  10 Sheets-Sheet 7

INVENTOR
James O. Melton
BY Stevens, Davis, Miller and Mosher
ATTORNEYS

INVENTOR
James O. Melton

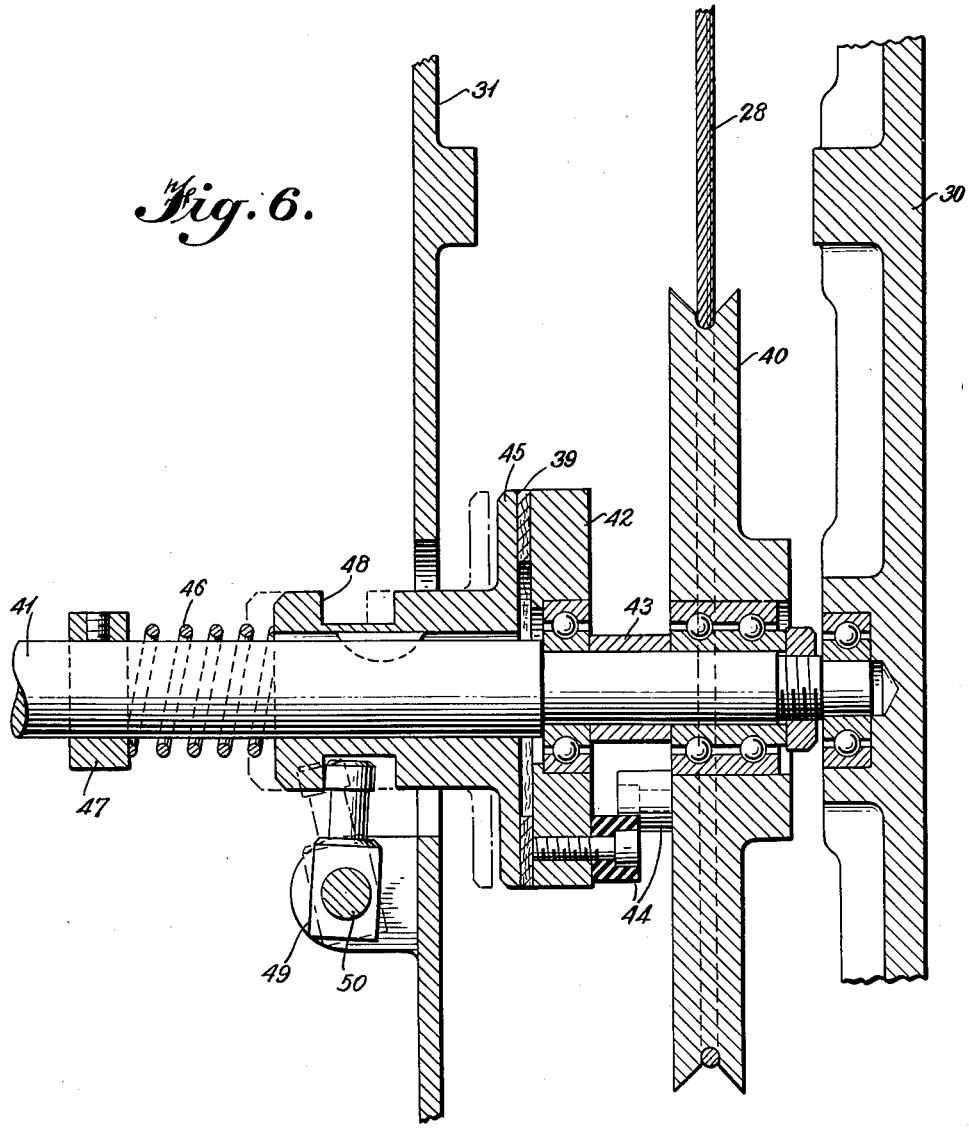

April 25, 1961

J. O. MELTON 2,981,102

WELL DEPTH RECORDER

Filed March 23, 1956

INVENTOR

*James O. Melton*

BY *Stevens, Davis, Miller & Mosher*

ATTORNEYS

United States Patent Office 2,981,102
Patented Apr. 25, 1961

2,981,102

WELL DEPTH RECORDER

James O. Melton, Norman, Okla., assignor to The Geograph Company, Oklahoma City, Okla., a partnership Filed Mar. 23, 1956, Ser. No. 573,515

2 Claims. (Cl. 73—151.5)

This invention relates to an apparatus for visually recording the time-depth sequence of an oil drilling operation, and, in particular, this invention relates to an apparatus capable of recording the time required for a drilling operation to progress a predetermined amount, such as, for example, the time required to drill one foot. The recording effected by the apparatus is continuous in the sense that the apparatus closely follows the drilling operation foot by foot while independently marking records of the time required to drill successive feet.

As has been previously appreciated in this particular art, recording apparatus capable of cooperating with an earth drilling rig to produce a record showing the actual time-depth sequence of a drilling operation, the speed of penetration through an earth formation, and the depth to which the drilling has progressed has an intrinsic value to the operator of the earth drilling rig, since it enables him to maintain a close check upon the operations without the necessity of being constantly present to supervise.

Heretofore, various types of recording apparatus have been proposed for making a record incident to an earth drilling operation. In all instances, however, the recording apparatus is arranged on a fixed time basis with variations introduced responsive to feet drilled. Essentially, all previous apparatus has produced a chart upon which the time function has been assigned to the ordinate, whereas indications of feet drilled have been assigned to the abscissa.

It is an object of the present invention to provide a novel recording apparatus useful in conjunction with an earth drilling operation which functions to advance a suitable chart paper on a foot-by-foot basis past a recording a pen and to induce deflections of the recording pen in a linear direction transverse to the chart paper with the length of the deflections being correlated with the time required to drill one foot into the earth. For this purpose, it is preferred that the chart drive impart to the chart paper an intermittent motion.

It is a further object of the present invention to provide self-contained apparatus for the purposes previously enumerated, which apparatus is ruggedly constructed for lasting and reliable performance under the most adverse conditions such as are encountered in an oil field.

As a still further object of the present invention, an apparatus is provided which does not require an external source of power, and thus its usefulness is in no way restricted by the presence or absence of a convenient supply of electrical, steam or other kind of power.

The above objects of the present invention, as well as numerous others, and the advantages to be derived from the use of the apparatus will become more readily apparent from the following detailed description when taken in conjunction with the appended drawings in which a preferred form of the invention is illustrated.

In the drawings:

Figure 2 is a view in section through the right side of the apparatus;

Figure 4 is a view in section taken along line 4—4 of Figure 2;

Figure 5 is a view in section taken along line 5—5 of Figure 2;

Figure 6 is a view in section taken along line 6—6 of Figure 4;

Figure 7 is a view in section taken along line 7—7 of Figure 2;

Figure 9 is a view in section through the unidirectional drive;

Figure 10 is a view in section taken along line 10—10 of Figure 9;

Figure 11 is an exploded view of the unidirectional drive;

Figure 21 is a view in section taken along line 21—21 of Figure 17;

In general, the present invention contemplates connecting one end of a line or cable to the kelly of a drill rig, passing the line around a metering wheel and fixing the other end to a spring-biased drum or winch. By this arrangement the movement of the kelly downward rotates the metering wheel. This motion is transferred to a gear train which includes a Geneva intermittent movement and a uni-directional transmission. The relationship between the kelly, cable, metering wheel and gear system is such that the Geneva movement indexes for each movement of the kelly downward for one foot. The purpose of the uni-directional drive is to prevent reverse rotation of the metering wheel from affecting the output of the gear train. A suitable chart paper is mounted to be advanced past a recording pen by a chart drive which is driven by the gear train. The chart drive includes a selective transmission which enables the rate of chart advance to be selected from two speeds. Due to the Geneva movement, an intermittent advance will be imparted to the chart correlated on a foot basis with downward movement of the kelly. The recording pen is drawn continuously across the chart on a time basis while it is stationary and released from the chart and returned to its starting point upon each advance of the chart due to indexing of the Geneva movement. The starting point for the recording pen is thus a base line from which time measurements are taken. It will thus be apparent that the recording operation will produce a chart showing the time required to drill each foot into the earth. Although one foot has been taken as the standard, it will be evident that any fraction of one foot or any multiple of one foot can as easily be taken as the standard.

Reference will now be made to the drawings which illustrate a preferred form of the present invention. In the following, it will be fully and completely described in detail.

Figure 1:
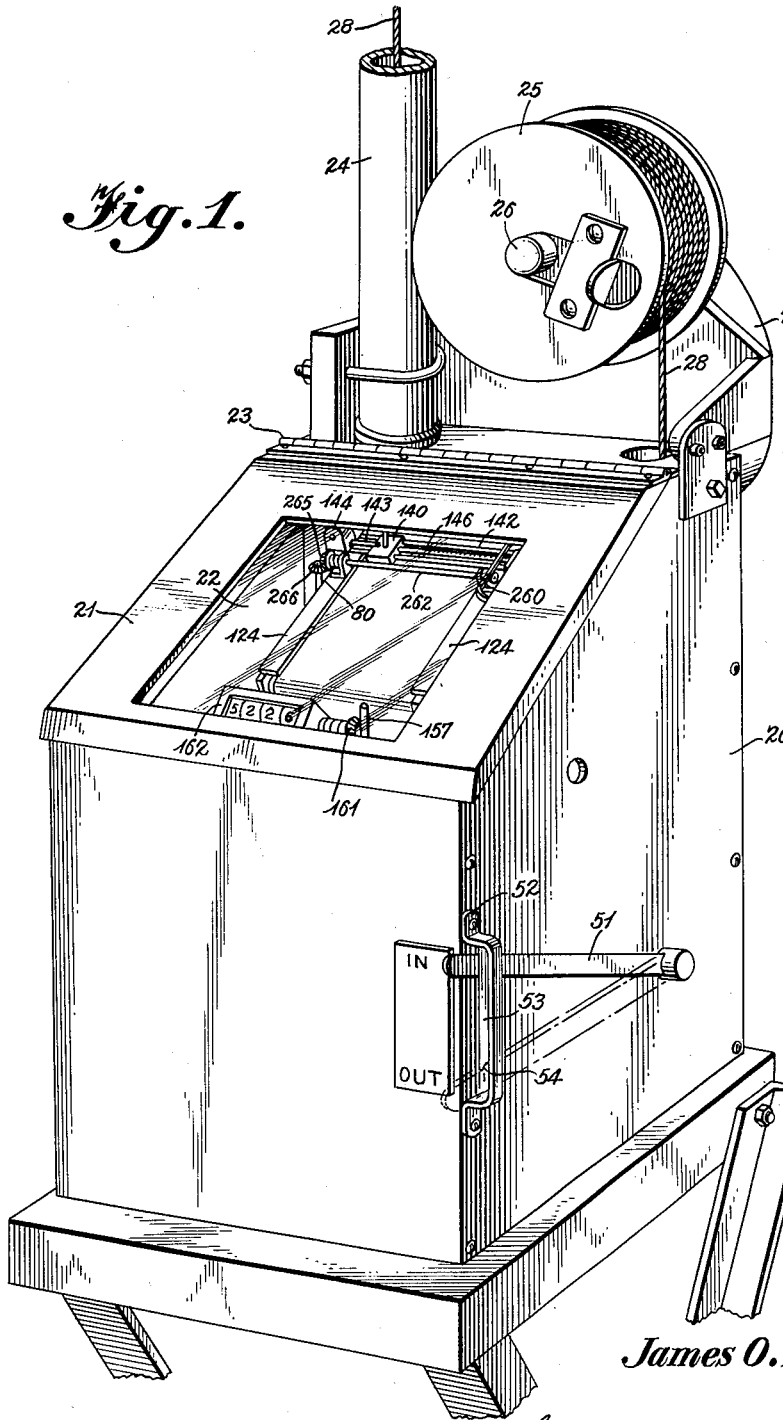
Figure 1 is a perspective view of the apparatus.

The apparatus as shown in Figures 1 and 2 is enclosed within a substantially rectangular casing 20 having an inclined top front plate 21 characterized by a transparent section 22 which enables visual inspection of a recording chart contained in the apparatus as well as other mechanisms contained therein. The plate 21 is hinged along its back edge to the top of the casing 20, as indicated at 23. A pipe 24 is fitted into the top of the casing 20 to permit a cable 28 to be introduced into the apparatus. A drum or a winch 25, which is spring biased, is mounted on a shaft 26 fixed to a bracket 27, likewise attached to the top of the casing 20. The drum 25 takes up cable 28 which is introduced into the apparatus through the pipe 24 and maintains a resilient pull upon it tending to take it up.

Figure 3:
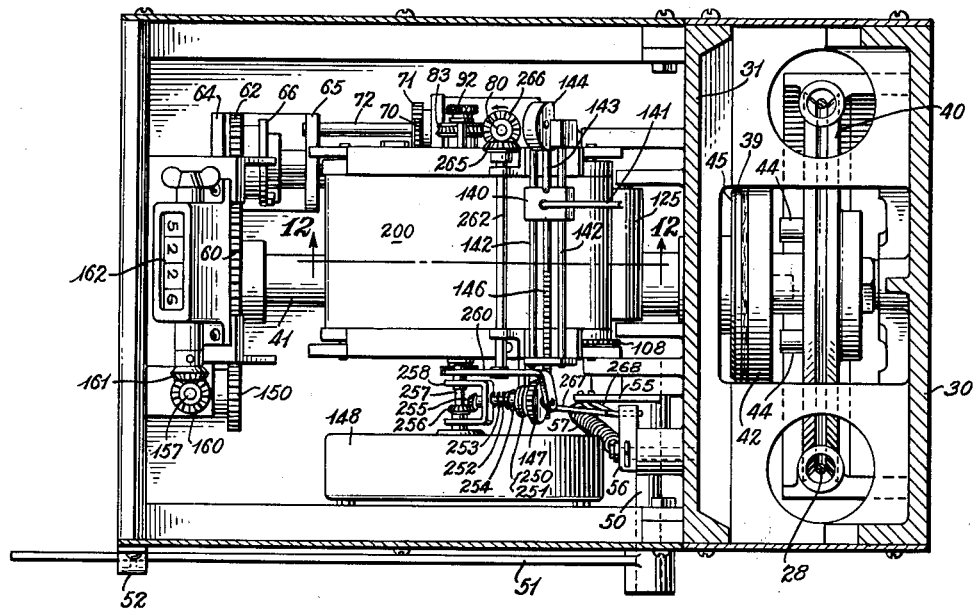
Figure 3 is a view in section taken along line 3—3 of Figure 2.

Within the casing 20 is a rectangular frame 30 defining a central partition 31 which divides the interior of the casing 20 into a front compartment and a back compartment (see Figure 2). Located in the back compartment is a metering wheel 40 bearing-mounted on a main drive shaft 41 which is journalled into the frame 30 at the rear of the apparatus and extends to the front of the apparatus whereat it is also journalled into the frame 30 (see Figure 6). Also bearing-mounted on the main driving shaft 41 is a clutch plate 42. Spacer 43 preserves the relative relationship of metering wheel 40 and clutch plate 42. Stops 44 are mounted on the opposing faces of the clutch plate 42 and the metering wheel 40 peripherally aligned so that rotation of the metering wheel 40 will cause its stop 44 to strike against the stop 44 located on clutch plate 42 and cause the clutch plate 42 at this time to rotate with it. The arrangement of stops 44 is in effect a lost motion connection between these two elements and serves the purpose of dampening oscillations of the metering wheel 40. A second clutch plate 45 is keyed to the main shaft 41 for sliding movement from a position in engagement with a friction pad 39 on clutch plate 42 and a position remote therefrom as shown in dotted lines in Figure 6. Clutch plate 45 is resiliently biased by spring 46 toward engagement with clutch plate 42. A collar 47 is fixed to the main shaft 41 to hold the position of one end of spring 46. The hub of clutch plate 45 defines a reduced section 48 which cooperates with a rocker arm or clutch operator 49. The latter element is fixed on a shaft 50 which is suitably supported by brackets and which projects through one side of casing 20 (see Figure 4). A clutch lever 51 is connected at one end to the projecting end of the shaft 50 and has its other end received through a guide bracket 52 mounted to the side of casing 20 and defining therewith a slot (see Figure 1). The bracket 52 is characterized by a web 53 which has an undercut portion 54 at its lower end. The lever 52 assumes either a position at the top of bracket 52, as shown in the drawings, or can be depressed to the bottom of the bracket 52 and held in the undercut section 54 as shown by the dotted lines. As shown in the drawings, the lever 51 is in its upper position at which time the clutch plates 42 and 45 are engaged. This is known as the "In" position. When the lever 51 is in the lower position, the clutch plates 45 and 42 will be disengaged by virtue of rocker arm 49 pulling clutch plate 45 away from clutch plate 42 against the influence of spring 46. This position is known as the "Out" position. It will thus be apparent that when the clutch plates 42, 45 are engaged, motions of the metering wheel 40 will be transmitted through the clutch plates 42, 45 and result in corresponding motions of motor shaft 41. An arm 55, as shown in Figures 3 and 4, is fixed to shaft 50 and another arm 56 is pivotally supported in partition 31. A biasing spring 57 connects the end of arm 55 to a point substantially at the center of arm 56. This spring 57 acts as a load for lever 51.

Figure 8:
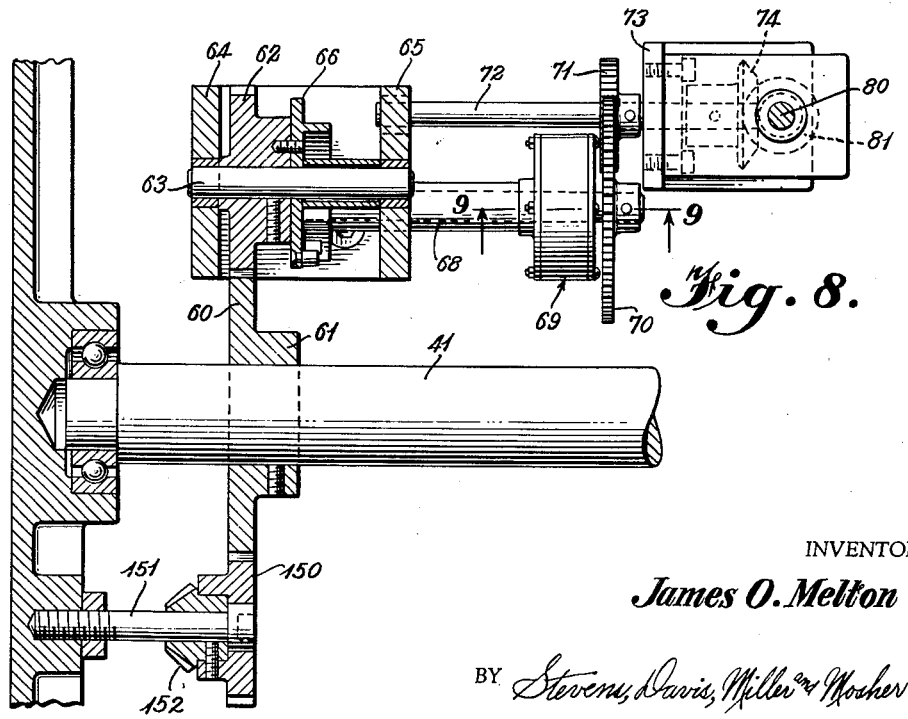
Figure 8 is a view in section taken along line 8—8 of Figure 2.

Toward the front of the apparatus (see Figures 2, 7 and 8) a ring gear 60 is mounted to the main shaft 41 by means of collar 61. In meshing engagement with gear 60 is a Geneva driving gear 62 fixed on to a shaft 63 supported by brackets 64 and 65 attached to the bottom frame portion of the apparatus. Also fixed to shaft 63 is a Geneva pin and ring portion 66 of a Geneva intermittent movement. A star wheel 67 is fixed to a shaft 68 which is also supported by the bracket 65. The shaft 68 is connected to an uni-directional drive 69 the output of which drives gear 70 which meshes with gear 71 fixed to a shaft 72 supported in a bracket 73. Fixed to the other end of shaft 72 is a miter gear 74. Also supported by bracket 73 is the lower end of a vertically extended shaft 80. Fixed to the lower end of shaft 80 is a miter gear 81 which meshes with miter gear 74.

Also meshing with gear 60 is a gear 150 mounted on shaft 151. Miter gear 152 is secured to gear 150 and meshes with miter gear 153 at the lower end of rod 154. A housing or sleeve 155 is supported between brackets 156 and receives rod 154.

A second rod 157 is received in the sleeve 155 with a spring 158 interposed between the rods. The sleeve is slotted at the top and pin 159 fixed to rod 157 rides in the slot. Rod 154 is anchored by pin 163 to sleeve 155. A miter gear 160 on the rod 157 meshes with a miter gear 161 acting as the input drive to a counter 162 (see Figure 1). The arrangement is such that rod 157 can be depressed into the sleeve 155 to free miter gears 160 and 161 to enable counter 162 to be reset.

The details of unidirectional drive 69 are shown in Figures 9, 10 and 11. It consists of a spider or drum 170 having four off center axial grooves 171 each containing a roller 172 and spring 173. The spider 170 is housed within a ring 174 to which is fixed face plates 175 and 176. Shaft 68 is secured to face plate 175 and shaft 177 is keyed to spider 170 and also mounts gear 70. When ring 174 is rotated in one direction the rollers 172 will be forced to the deep ends of their axial grooves 171 against their springs 173 and the drive will slip, no motion being imparted to the spider 170. When, however, the ring 174 is rotated in the reverse direction, the rollers 172 will be forced to the shallow ends of the axial grooves 171 where they cam or wedge together the ring 174 and spider 170. Thus, rotation of ring 174 will impart rotation to spider 170.

Figure 17:
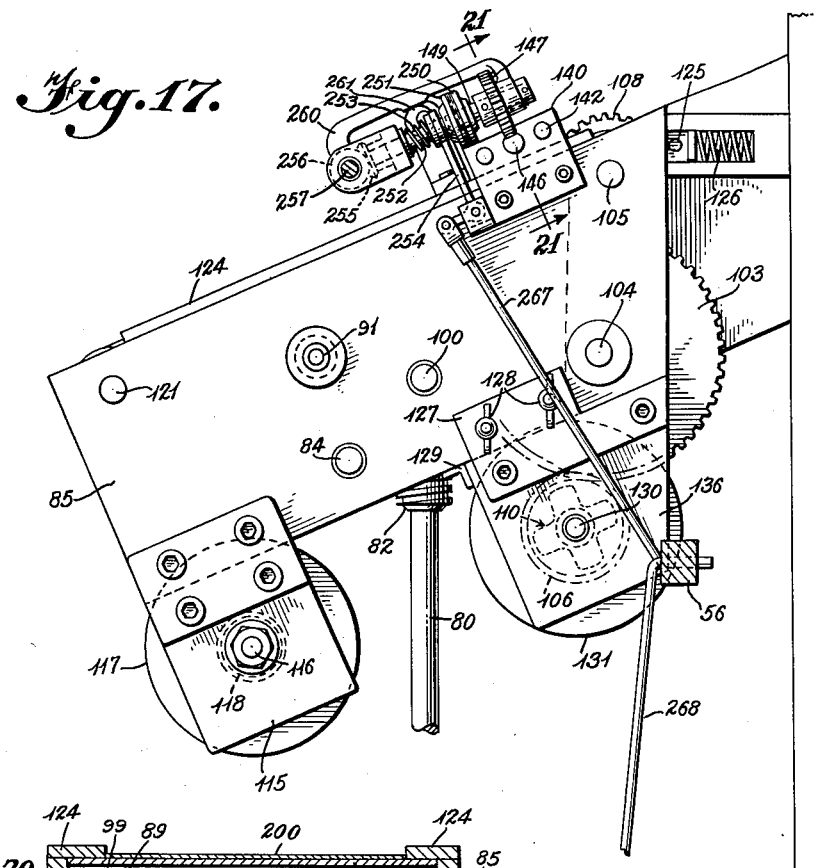
Figure 17 is a view in side elevation of the paper handling and drive mechanism.
Figure 18:
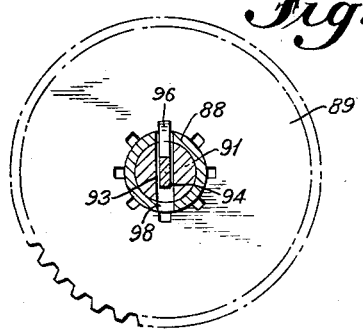
Figure 18 is a view in section taken along line 18—18 of Figure 12.
Figures 19, 20:
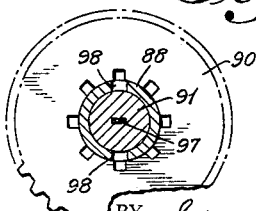
Figure 19 is a view in section taken along line 19—19 of Figure 18.
Figure 20 is a view in section taken along line 20—20 of Figure 18.

Located in the upper region of the front compartment is a chart recording mechanism and chart drive (see Figures 2 and 12 to 20). Essentially, the mechanism is comprised of an open-ended open-bottomed box frame with the top plate 123 of the frame acting as a marking plate. The shaft 80 extends along one side plate 85 of the box frame and at a point below the top plate 123 has mounted or fixed to it a worm 82 which meshes with a worm gear 83 fixed to one end of drive shaft 84 which is journalled in the side plates 85 of the box frame as best shown in Figure 18. Also fixed on shaft 84 is a drive gear 86 which meshes with a drive gear 87 fixed onto a sleeve 88, likewise journalled in the side frame members 85. Also there are mounted on sleeve 88 a pair of gears 89 and 90 which define internal splines. The gears 89 and 90 are of different sizes and are freely rotatable relative to the sleeve 88. Received through the sleeve 88 is a shift shaft 91 having a knurled knob 92 fixed to either end. The shaft 91 in the region of the gears 89 and 90 defines a slot 93 in which is received a key element 94 which is pivotally mounted by means of pin 95. The key element 94 is characterized by a tang 96 which normally projects out of the slot 93 under the influence of the spring 97 which is fixed in the shaft 91. The outer sleeve 88, as best shown in Figures 19 and 20, defines a pair of slots 98 along a diameter, which pair of slots 98 are in alignment with the slot 93 defined in the shaft 91. The relative spacing of the gears 89 and 90 is fixed by means of collars 99 which, in turn, are fixed onto the sleeve 88 by means of set screws or similar expedients. The collars 99 define tapered or countersunk end faces which function in the circumstances of this particular arrangement to cam the key element 94 into the slots 93 and 98 against the force of spring 97 when the tang 96 contacts an end face of a collar. When, however, the shaft 91 is positioned with the tang 96 in registry with either one of gears 81 and 90, the internal splines defined by the gear will permit the spring 97 to urge the tang 96 to a position outside of the slots 93 and 98 to engage with the particular gear. In order to facilitate placement of the key element 94, the arrangement is such that when one shift knob 92 is pressed against its respective side plate 85, the key element 94 will engage with one of the gears 89 and 90 and, similarly, when the other shift knob 92 is positioned against its respective side plate 85, the key element 94 will engage with the other of the two gears. The arrangement described constitutes a convenient selective transmission having two speeds.

Figure 12:
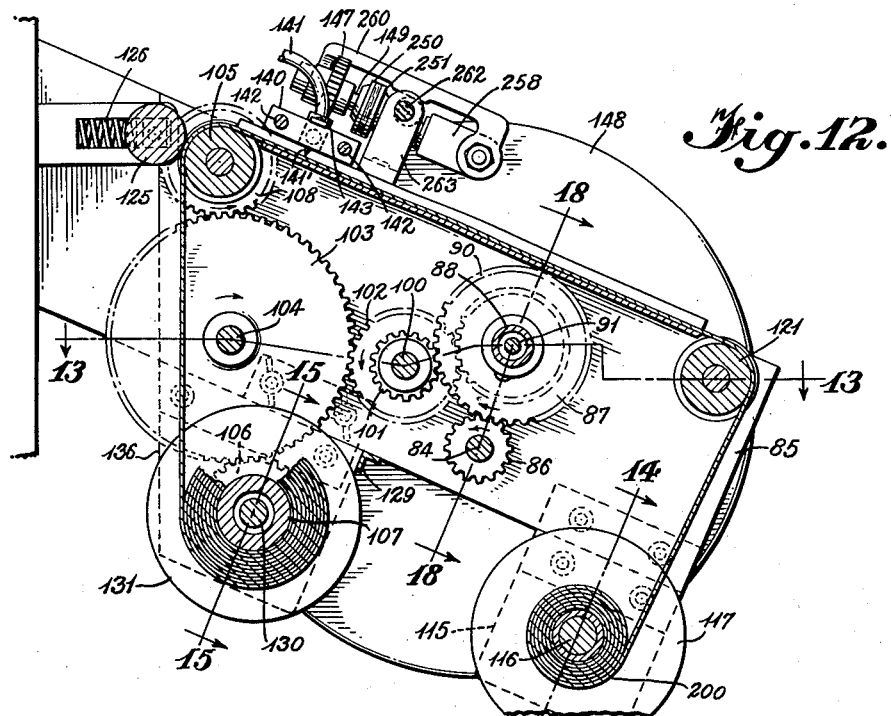
Figure 12 is a view in section showing the paper handling and drive mechanism.
Figure 13:
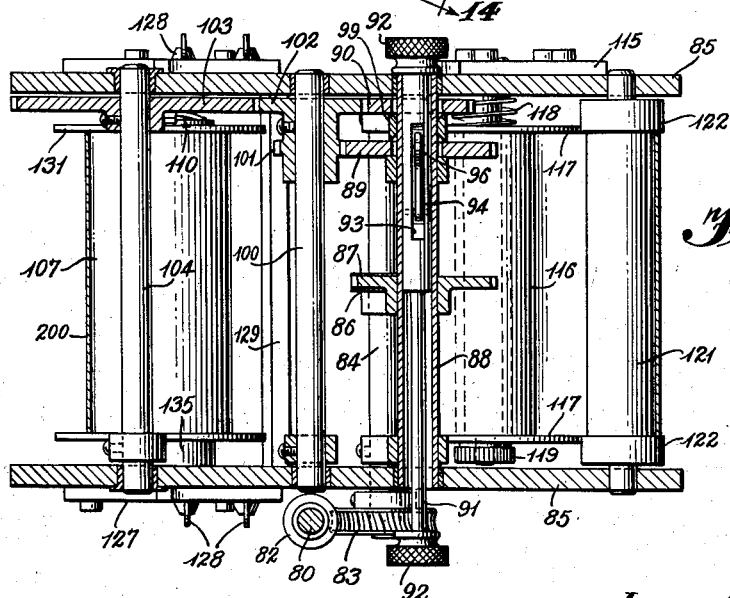
Figure 13 is a view in section taken along line 13—13 of Figure 12.
Figure 14:
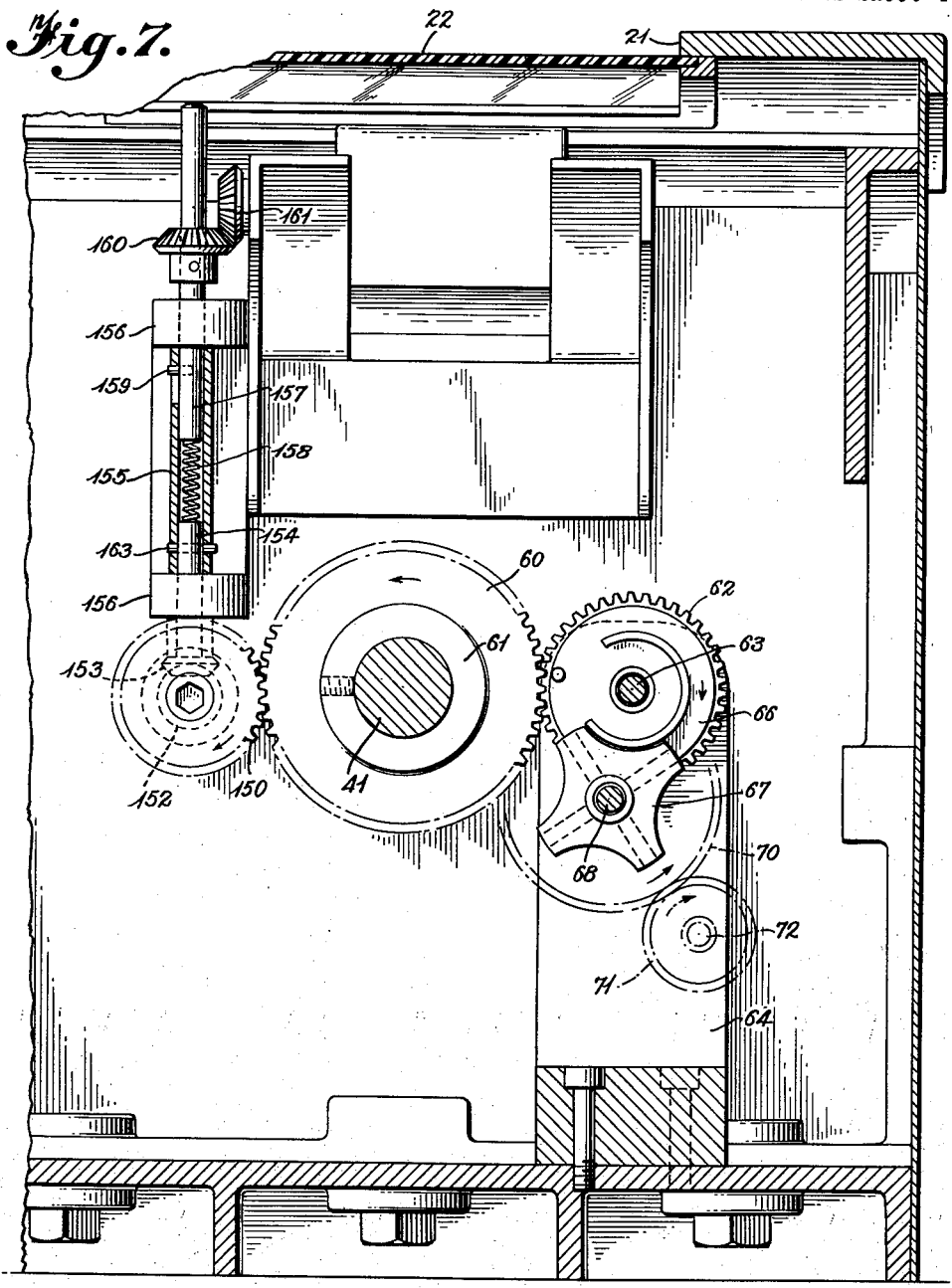
Figure 14 is a view in section taken along line 14—14 of Figure 12.
Figure 15:
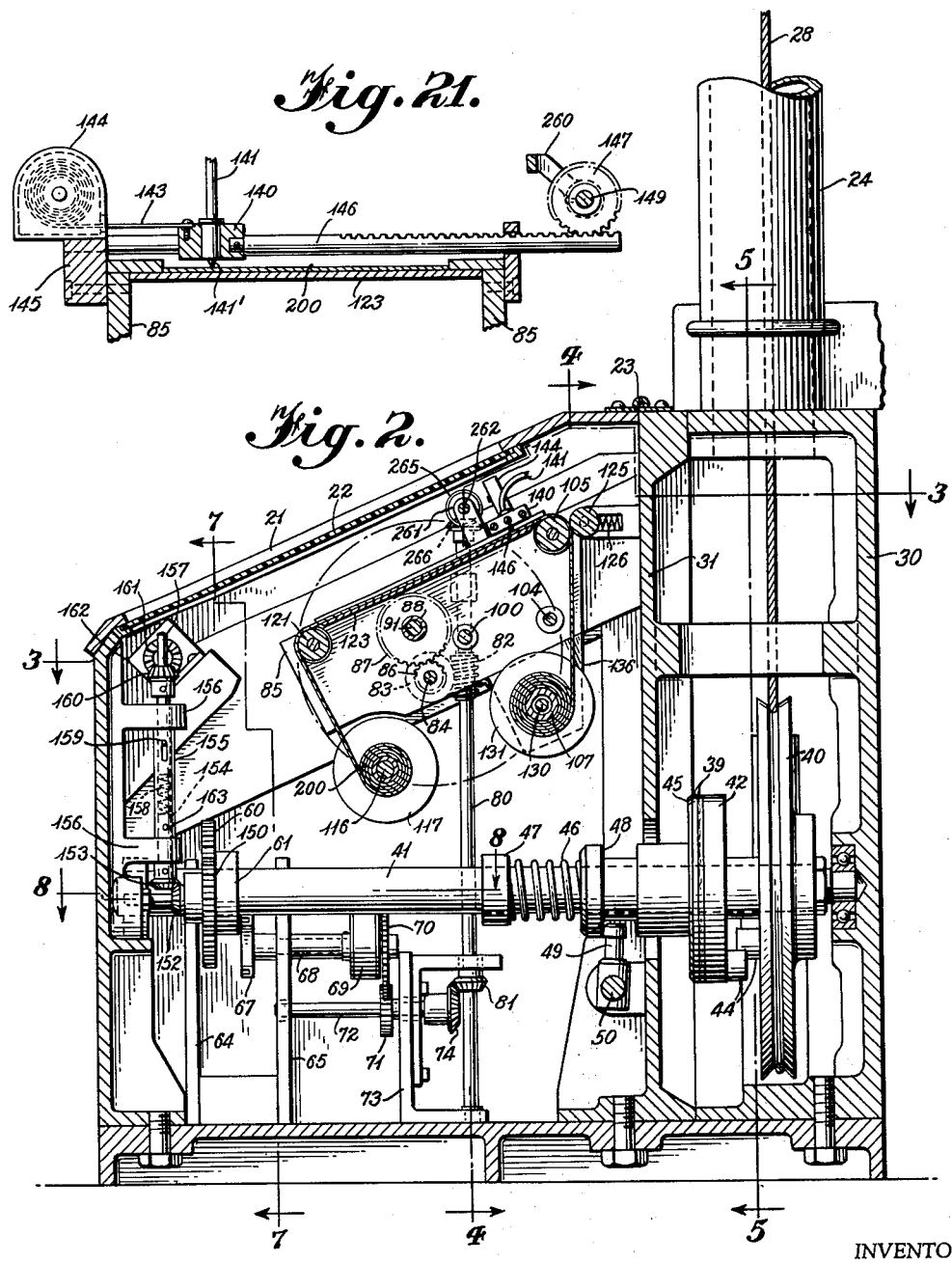
Figure 15 is a view in section taken along line 15—15 of Figure 12.
Figure 16:
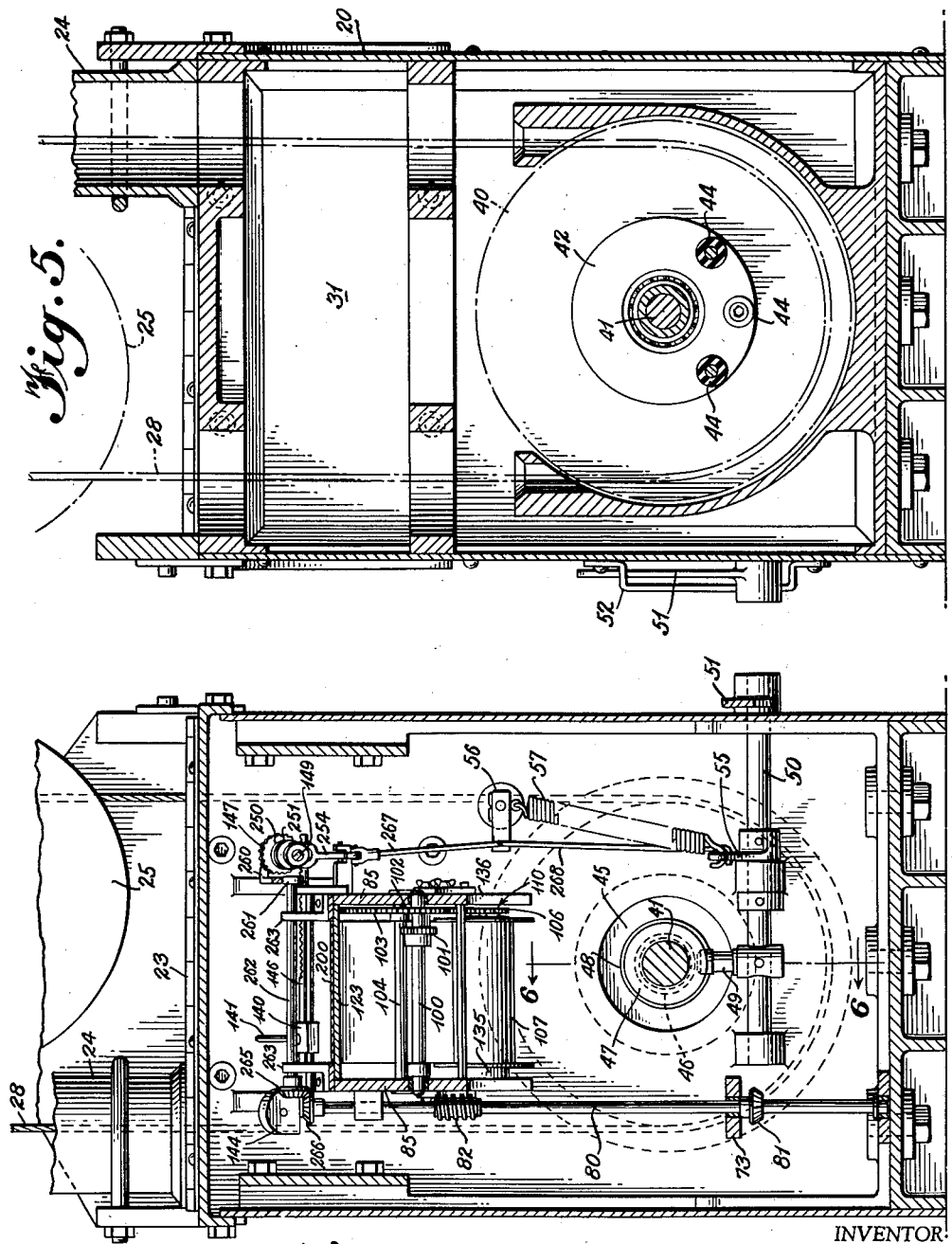
Figure 16 is a plan view of the take-up roll showing a spring clip anchor.

A shaft 100, shown in Figures 2, 4, 12 and 13, is journalled in the side frame elements 85 and carries a gear 101 meshing with gear 89 and a gear 102 meshing with gear 90. Gear 102, in turn, meshes with a counter gear 103 which is fixed on the shaft 104 journalled in the side elements 85. Gear 103 drives gear 108 fixed to a paper drive roller 105 and a gear 106 associated with a paper take-up roller 107 as best shown in Figure 12. A slip clutch, generally designated as 110 as shown in Figure 15, is interpositioned between gear 106 and paper take-up roller 107. Chart paper 200 in roll form is supported on the front part of the box frame by means of a plate 115 which is detachably bolted to one of the side frame elements 85 as shown in Figures 12 and 17. A shaft 116 is cantilever supported from plate 115 and is threaded at its free end. A pair of disks 117 are slidably supported on a shaft 116 and the disk 117 nearest plate 115 is resiliently biased by spring 118 toward its companion disk 117 as shown in Figures 13 and 14. A nut 119 is threaded on to the free end of shaft 116 to prevent displacement of disks 117. The chart paper 200 rolled for instance on a cardboard core, loosely slips on the shaft 116 with the disks 117 and spring 118 acting to provide a measure of tension.

The chart paper 200 is withdrawn from the supply roll and passed over a back paper roller 121 freely rotatably supported by the side frame elements 85 as shown in Figures 12 and 13. Each end of the roller 121 defines a raised flange 122 for the purpose of guiding the paper. The paper thereafter passes over the top plate 123 of the box frame which, likewise, as shown in Figures 1, 17 and 18 is characterized by raised side flanges 124, again for the purpose of guiding the paper. Thereafter, the paper passes over the paper drive roller 105 and is taken up on the paper take-up roller 107 as shown in Figure 12. A pressure roller or paper friction roller 125 bears against the chart paper pressing it firmly against the paper drop roller 105. Roller 125 is resiliently biased by means of a spring 126. The paper take-up roller 107 is supported on a shaft 130 which is supported by plates 136 detachably connected to side frame elements 85 by means of plates 127 which are bolted to plates 136 and which are connected to side frame elements 85 by means of wing nuts 128 to facilitate removal as shown in Figures 15 and 17. Each plate 136 has connected to it a small angle iron bracket 129 which engages with the undersurface of its respective side frame element 85 in order to maintain the relative position of plate 136 to side frame element 85.

Shaft 130 is journalled into the plates 136 and carries gear 106 as best shown in Figure 15. Received on the shaft 130 is roller 107 which is freely rotatable by virtue of "bosted" bronze bushings 132 which are made of graphite impregnated sintered brass. The slip clutch 110, previously referred to, is composed of one flange 131 of roller 107 cooperating with a suitable friction plate 133. This latter element is resiliently urged by means of a four-armed spring element 134 against the flange 131 of roller 107. The friction plate 133 is annular in shape and defines four cut-outs into which are received the four arms of the spring 134 (see also Figures 16 and 17). The friction plate 133 is keyed to the shaft 130 so that motions of shaft 130 will be imparted to the roller 107 subject to slipping. The other end of roller 107 is spaced from plate 136 by means of a brass spacer 135. The roller 107 includes a pair of spring clips 137 located at either end for the purpose of holding the leading edge of a roll of chart paper to facilitate take-up or wind-up of the chart on the roller 107. The spring clips 137 are slightly set into the surface of roller 107 and are pivotally supported by pins 138. Springs 139 each having one end anchored in the roller 107 and its other end overlying the clip 137 resiliently bias the clips 137 toward the roller 107 (see Figure 16).

A mounting block 140 is positioned over the chart paper 200 on top plate 123 of the box frame as shown in Figures 1, 2, 3, 4, 12 and 17, and, in particular, in Figure 21. The mounting block 140 has fixed thereon a recording pen 141, the marking tip 141' of which projects from the bottom surface of the block 140 to mark a record on the chart paper. The block 140 is slidably supported on guide rails 142 which extend transversely across the top plate 123 and the chart paper.

One end of a tape 143 is fixed to the mounting block 140 with the remainder of the tape 143 being wound or reeled in a suitable housing 144 in which it is anchored. A suitable spring bias is provided in housing 144 tending to take-up the tape 143. The housing 144 is mounted on a block 145 suitably supported from the box frame. Also connected to the block 140 is one end of a rack 146 which cooperates with a timing gear 147 driven by a wind-up spring driven clock 148 as shown in Figure 3. Timing gear 147 is fixed on a shaft 149 upon which is also mounted a clutch plate 250 (see Figures 3, 4, 12 and 17). The engaging or coupling clutch plate 251 is mounted on a shaft 252 and is urged by spring 253 into coupling position. A clutch operator fork 254 is pivotally supported to be capable of rocking the clutch plate 251 out of engagement with plate 250. The fork 254 is operated by the lever 51 via a link 267 connected to arm 56 and link 268 connected to arm 56 and arm 55 as best shown in Figures 4 and 17. When the apparatus is inoperative, clutch plates 250 and 251 are disengaged to prevent the timing gear 147 being continuously driven which would otherwise be the case since clock 148 will continue to operate until it runs down. A miter gear 255 is fixed to the end of shaft 252 and meshes with a miter gear 256 fixed to clock drive shaft 257 as best shown in Figure 3. A yoke 258 supports the shafts 252 and 257. An operator bar 260 is bearing-supported on one end of shaft 257 with its other end holding shaft 149 adjacent to the timing gear 147 as best shown in Figures 12 and 17. A cam 261 cooperates with the operator bar 260 to pivot this member about the shaft 257 for the purpose of raising the timing gear 147 out of meshing engagement with the rack 146 (see also Figures 2, 3 and 4). The cam 261 is fixed to the end of a clock cam release shaft 262 suitably supported by brackets 263. A miter gear 265 fixed to the other end of the cam clock release shaft meshes with a miter gear 266 fixed to the end of vertically extended shaft 80 as best shown in Figure 4. The arrangement is such that each time the Geneva intermittent movement indexes cam 261 raises operator bar 260 to lift timing gear 147 from rack 146 enabling the spring tensioned tape 143 to return the mounting block 140 and pen 141 to the left side of the chart.

Figure 23:
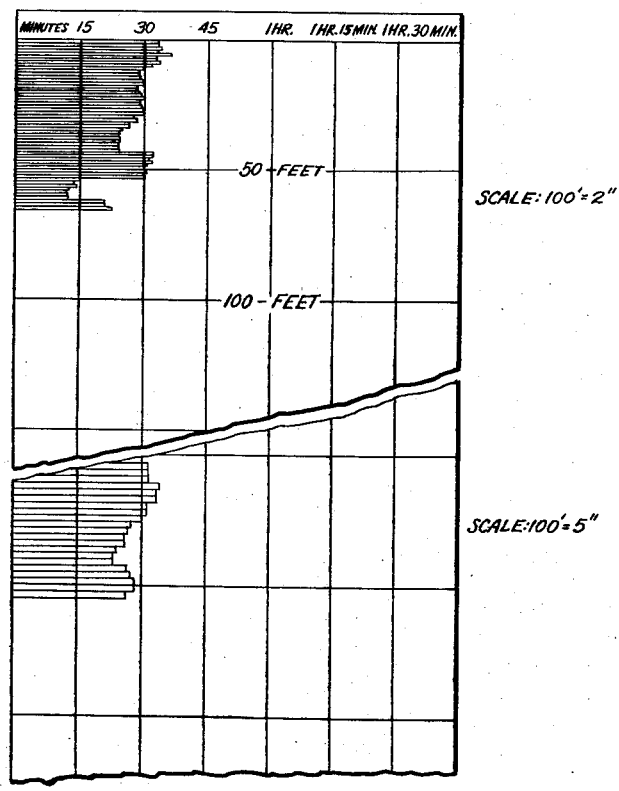
Figure 23 is a view of a chart produced by the apparatus.

A replica of a chart produced by the apparatus is shown in Figure 23. As will be noted, the chart is arranged with depth indicia in feet dimensions along the ordinate and with time indicia in minute and hour dimensions along the abscissa (in a direction transverse to the chart movement past the pen 141). The operation of the apparatus produces markings on the chart based on a scale dependent upon the two speed selective transmission of the chart drive. For one speed, the scale is 100 ft. per 2 inches of chart advance and for the other speed, the scale is 100 ft. per 5 inches of chart advance. At the beginning of each foot to be drilled the pen 141 is positioned along the left edge of the chart and is drawn at an even rate transversely across the chart marking a record until the timing gear 147 is released from the rack 146 by the action of cam 261 at which time the pen 141 is swiftly returned to the left edge of the chart ready to record the time required to drill the next foot of depth. The chart produced by the apparatus will give extremely valuable information of a geological nature as will be evident.

Figure 22:
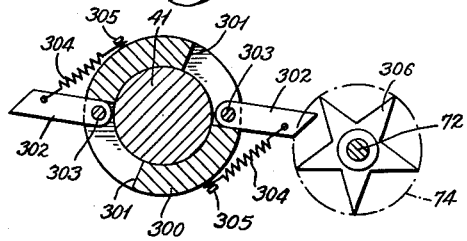
Figure 22 is a view in section through the main shaft showing an alternative take-off.

An alternative take-off from the main shaft 41 to drive the chart is shown in Figure 22. As shown a collar 300 having opposed peripheral slots 301 is secured to main shaft 41. A pawl 302 is pivotally supported by pin 303 in each slot 301 of the collar 300 adjacent one end. Each pawl 302 is resiliently biased by a spring 304 anchored to the periphery of collar 300 by a pin 305. A star wheel 306 is located adjacent the main shaft 41 in a position to be engaged by pawls 302. As the main shaft 41 rotates counterclockwise, each pawl 302 as it strikes an arm of star wheel 306 will advance it one position. Reverse rotation of main shaft 41 will have no effect on the star wheel 306 since the pawls 302 can be resiliently displaced in this direction. The star wheel 306 is mounted on shaft 72 which also mounts miter gear 74 driving shaft 80.

For optimum operation of pen 141, it is preferred that pen 141 be floated in block 140 and resiliently urged toward the chart. For this purpose, a spring or rubber sleeve can be used. Alternatively, the pen 141 can be gravity loaded by placing a suitable weight on it to urge the tip 141' toward the chart. These expedients have been found desirable to take care of variations in chart paper thickness.

Although the present invention has been shown and described with reference to a preferred embodiment, it will be appreciated that such changes as are apparent to those skilled in this art from a knowledge of this invention are deemed to be within the spirit, scope and contemplation of this invention.

What is claimed is:

1. A recorder comprising a frame, a main shaft journalled in said frame, a measuring wheel freely rotatably mounted on said main shaft and adapted to be driven by a cable, clutch means drivingly connected to said shaft, a lost motion means drivingly connecting said wheel and said clutch means, a collar including projecting parts fixed to said main shaft, a star wheel mounted for free rotation in a position to be driven by said projecting parts, a selective transmission drivingly connected with said star wheel, a chart movable over a predetermined path within said recorder, a guide rail extending transversely over said chart path, a block slidingly received on said guide rail, a recording element mounted in said block and adapted to operatively engage said chart located in the chart path and mark a record thereon, a spring biased tape connected at one end of said frame and connected at the other end to said block for urging said block towards one edge of said chart path, means driven by said selective transmission for moving said chart over said chart path, a rack attached to one end of said block and extending parallel with said guide rail, a timing gear engaging with said rack, a timer drivingly connected with said timing gear for moving said block in a direction away from said one edge of said chart path, a pivotally mounted operator bar connected with said timing gear, a cam cooperating with said operator bar to disengage said timing gear from said rack at least once per revolution of said cam, and means drivingly connecting said cam with said star wheel.

2. A recorder comprising a frame, a main shaft journalled in said frame, a measuring wheel freely rotatably mounted on said main shaft and adapted to be driven by a cable, a first clutch plate freely rotatably mounted on said main shaft, stops mounted on the opposing faces of said measuring wheel and said first clutch plate, said stops being in peripheral alignment and axially overlapping so that rotation of said measuring wheel will cause rotation of said first clutch plate, a second clutch plate keyed to said main shaft for sliding movement, means adapted to slide said second clutch plate into coupling engagement with said first clutch plate, a ring gear fixed to said main shaft, an intermittent motion mechanism driven by said ring gear, a unidirectional mechanism drivingly connected with the output of said intermittent motion mechanism, a two-speed selective transmission drivingly connected with said unidirectional mechanism, a chart take-up roll driven by said transmission, a guide rail extending transversely over a chart path, a block slidingly received on said guide rail, a recording pen mounted in said block and adapted to operatively engage a chart located in the chart path and mark a record thereon, a spring biased tape connected at one end to said frame and connected at the other end to said block for urging said block towards one edge of said chart path, a rack attached to said block and extending parallel with said guide rail, a timing gear engaging with said rack, a first clutch plate drivingly connected with said timing gear, a second clutch plate, spring means biasing said clutch plates into coupling engagement, means adapted to uncouple said clutch plates against the action of said spring, a timer drivingly connected with said second clutch plate for moving said block in a direction away from said one edge of said chart path, a pivotally mounted operator bar connected with said timing gear and a cam cooperating with said operator bar to raise said timing gear out of engagement with said rack at least once per revolution of said cam, and means drivingly connecting said cam with said unidirectional mechanism.

References Cited in the file of this patent

UNITED STATES PATENTS

| | | |
|---|---|---|
| 735,012 | Barnes | July 28, 1903 |
| 2,357,051 | McLaine | Aug. 29, 1944 |
| 2,390,178 | Rutherford | Dec. 4, 1945 |
| 2,421,438 | Shonnard | June 3, 1947 |
| 2,535,096 | Scivally | Dec. 26, 1950 |
| 2,600,336 | Scivally | June 10, 1952 |
| 2,628,498 | Smith | Feb. 17, 1953 |